United States Patent
Collins

(10) Patent No.: US 9,000,311 B1
(45) Date of Patent: Apr. 7, 2015

(54) CRANE SCALE ANTI-TORQUE AND PROTECTION HOUSING

(71) Applicant: Jeff L. Collins, Greeneville, TN (US)

(72) Inventor: Jeff L. Collins, Greeneville, TN (US)

(*) Notice: Subject to any disclaimer, the term of this patent is extended or adjusted under 35 U.S.C. 154(b) by 249 days.

(21) Appl. No.: 13/737,390

(22) Filed: Jan. 9, 2013

(51) Int. Cl.
| | |
|---|---|
| G01G 19/14 | (2006.01) |
| G01G 21/28 | (2006.01) |
| B66C 1/40 | (2006.01) |
| G01G 19/08 | (2006.01) |
| G01G 19/12 | (2006.01) |
| B66C 13/16 | (2006.01) |
| G01G 23/28 | (2006.01) |

(52) U.S. Cl.
CPC ............ *B66C 1/40* (2013.01); *G01G 19/083* (2013.01); *G01G 19/12* (2013.01); *G01G 19/14* (2013.01); *B66C 13/16* (2013.01); *G01G 23/28* (2013.01)

(58) Field of Classification Search
CPC ..... G01G 19/08; G01G 19/083; G01G 19/12; G01G 19/14; G01G 21/23; B66C 1/40; B66C 13/16; B66F 17/00
USPC .............. 177/132, 136, 145, 147, 154–159, 177/238–244
See application file for complete search history.

(56) References Cited

U.S. PATENT DOCUMENTS

| | | | | |
|---|---|---|---|---|
| 3,290,931 A | * | 12/1966 | Fowkes et al. | 73/862.56 |
| 3,517,761 A | * | 6/1970 | Wigman et al. | 177/147 |
| 3,517,762 A | * | 6/1970 | Hedger | 177/153 |
| 3,827,514 A | * | 8/1974 | Bradley | 177/147 |
| 3,910,365 A | * | 10/1975 | Buchele | 177/165 |
| 4,475,610 A | * | 10/1984 | Schwarzschild | 177/211 |
| 5,072,798 A | * | 12/1991 | Franklin | 177/147 |
| 5,944,162 A | * | 8/1999 | Filiberti | 194/204 |
| 6,528,739 B1 | * | 3/2003 | Nowosielski et al. | 177/45 |
| 7,022,921 B2 | * | 4/2006 | Petrotto | 177/144 |
| RE40,099 E | * | 2/2008 | Stephens et al. | 177/147 |
| 7,514,639 B2 | * | 4/2009 | Heuer | 177/147 |
| 7,829,801 B2 | * | 11/2010 | Nizzere et al. | 177/184 |

* cited by examiner

*Primary Examiner* — Randy W Gibson
*Assistant Examiner* — Natalie Huls
(74) *Attorney, Agent, or Firm* — Michael I. Kroll

(57) ABSTRACT

A protective housing and scale structure for use with a crane boom is disclosed. The housing enclosure includes an upwardly extending crane link compartment that allows for the enclosure and the scale to be attached simultaneously and the enclosure also includes a pair of stabilizers and an aperture in its bottom portion. A load bearing member depends from the scale, extends through the aperture, and engages with the stabilizers to prevent torque and/or compression from affecting the scale. The enclosure also includes a locking means as an anti-vandalism or theft feature and the invention incorporates a wireless remote readout.

8 Claims, 9 Drawing Sheets

CRANE SCALE ANTI-TORQUE AND PROTECTION HOUSING

BACKGROUND OF THE INVENTION

1. Field of the Invention

The present invention relates generally to scales and, more specifically, to a crane scale protective housing designed to prevent damage and minimize torsional forces that can affect the accuracy of the scale. The housing comprises an enclosure having a top and bottom wall and additionally includes front, back and side walls.

A crane boom link compartment extends from the top wall having a boom attachment bore passing through the compartment's front and rear wall with a compartment interior access aperture that serves as receptacle for a scale hanger.

Extending from the bottom of the protective housing is a pair of stabilizers positioned on each side of a large aperture in the bottom wall with each stabilizer having a recess located proximate its base.

Interiorly, the scale protective housing has a scale with a hanger that is positioned within the crane link compartment where the hanger is aligned with the compartment's throughbore so that a connection between the scale protective housing and a crane boom supports both the housing and the scale hanger. Projecting from the base of the scale is a load bearing eye bolt with the eye having the jaw portion of a jaw and eye swivel joint attached to it. The swivel joint extends through a large opening in the bottom of the protective housing and between the stabilizer's recesses where a long bolt passes through the swivel joint eye and projects to the left and right beyond the recesses at the stabilizers bases. The long bolt also passes through a pair of hydraulic rotator attachment plates having a pair of apertures for pinning the jaws of a hydraulic rotator that will support a load.

The scale's protective housing stabilizers and the large bolt serve a critical protective function for the scale by preventing damage that can happen when the scale's load bearing eye bolt is forced back into the scale, which is easily done when the scale is compressed between the crane boom and load.

2. Description of the Prior Art

There are other devices which provide for weight scale protection. While these devices may be suitable for the purposes for which they where designed, they would not be as suitable for the purposes of the present invention as heretofore described.

It is thus desirable to provide a crane scale protective housing that prevents compression of the scale components.

It is further desirable to provide a stop for a crane scale so that when a crane scale having a load hits the ground or other solid surface the force is not directed to the scale components.

SUMMARY OF THE PRESENT INVENTION

A primary object of the present invention is to provide a scale protective housing to prevent any possible rotation and compression to the scale assembly.

Another object of the present invention is to provide a scale protective housing having a top and bottom wall with front, back and side walls.

Yet another object of the present invention is to provide a scale protective housing wherein said front wall is detachable, having a lock thereon to form an anti-vandalism cover.

Still yet another object of the present invention is to provide a scale protective housing wherein said top wall has an exteriorly disposed crane link compartment with a boom attachment bore whereby said protective housing can be fixedly attached to a crane boom.

An additional object of the present invention is to provide a scale protective housing wherein the crane link compartment has an interior access aperture that forms a receiving area whereby a scale hanger support can be positioned therein.

A further object of the present invention is to provide a scale protective housing wherein said bottom wall has a pair of exteriorly depending stabilizers positioned on opposing sides of a large aperture within the bottom wall.

A yet further object of the present invention is to provide a scale protective housing wherein each of the stabilizers has a recess positioned proximate the base.

A still yet further object of the present invention is to provide a scale protective housing having a scale with a support hanger located within the housing.

Another object of the present invention is to provide a scale protective housing where the a scale hanger can be inserted into the crane link compartment receiving area so that the support hanger aperture coaligns with the top compartment crane boom attachment bore thereby when the unit is fixedly attached to a crane boom the scale protective housing and scale are independently supported by the crane boom fastener.

Yet another object of the present invention is to provide a scale protective housing having a scale with a load bearing eye bolt located on its base.

Still yet another object of the present invention is to provide a protective housing having a jaw and eye swivel fixedly attached to said scale load bearing eye bolt and extending through the bottom wall aperture of the housing.

An additional object of the present invention is to provide a protective housing where the eye of the jaw and eye swivel is positioned between the scale housing stabilizers and is substantially aligned with the stabilizers recesses.

A further object of the present invention is to provide a protective housing having a long bolt positioned within the swivel joint eye that extends beyond the ends of the stabilizer recesses.

A yet further object of the present invention is to provide a protective housing having a pair of hydraulic rotator attachment plates that are also mounted on the long bolt.

A still yet further object of the present invention is to provide a protective housing wherein the hydraulic rotator attachment plates have a pair of apertures whereby the jaws of a hydraulic rotator can be pinned to the plates.

Another object of the present invention is to provide a protective housing that further provides a pair of washers and cotter pins mountable to the long bolt to fix it in place.

Yet another object of the present invention is to provide a crane scale having a protective housing wherein said scale has a remote handheld wireless receiver incorporating a control panel and display for remotely displaying the functions and results of a weighing task.

Additional objects of the present invention will appear as the description proceeds.

The present invention overcomes the shortcomings of the prior art by providing a crane scale having a protective housing comprising an enclosure having a top and bottom wall with front, back and side walls. Extending upwards from the top wall is a crane link compartment with an interior access aperture that serves as receiving area for a hanger supporting a scale. Extending from the bottom of the protective housing is a pair of stabilizers positioned on each side of a large aperture in the bottom wall with each stabilizer having a recess located at its base. The scale hanger is positioned within the top wall crane link compartment receptacle with the hanger coaligned with a compartment s crane boom attachment bore so that a fastener attaching the scale protective housing to a crane boom supports the housing and the scale hanger. Projecting from the base of the scale is a load bearing eye bolt with a jaw and eye swivel joint attached to it. The swivel joint extends through the large opening in the bottom of the protective housing and between the stabilizer's recesses where a long bolt is inserted through the swivel joint eye and projects beyond the ends of the stabilizer recesses. Also attached to the long bolt is a pair of hydraulic rotator attachment plates having a pair of apertures for fixedly attaching the jaws of a hydraulic rotator that is adapted to support a load.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
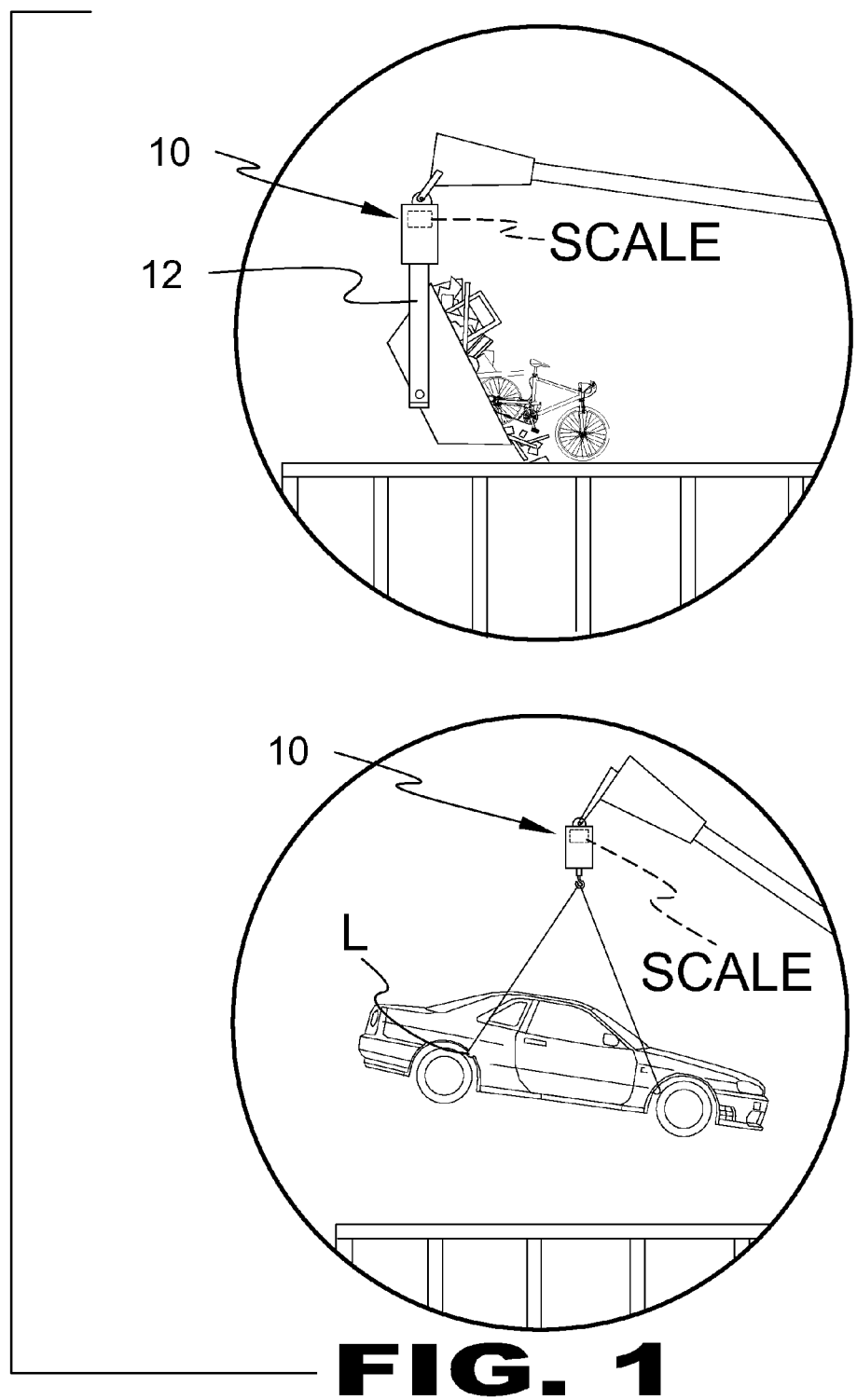
FIG. 1 is an illustrative view of the present invention.

Turning now descriptively to the drawings, in which similar reference characters denote similar elements throughout the several views, the figures illustrate the use of the present invention. With regard to the reference numerals used, the following numbering is used throughout the various drawing figures.

10 Anti-torque protection enclosure
12 Stabilizers
14 Enclosure top wall
16 Enclosure bottom wall
18 Enclosure front wall
20 Enclosure side walls
22 Enclosure back wall
24 Crane link compartment
26 Crane boom attachment bore
28 Crane link compartment front wall
30 Crane link compartment rear wall
32 Crane link compartment interior access aperture
34 Enclosure bottom wall aperture
36 Stabilizer recess
38 Scale
40 Scale hanger
42 Load bearing eye bolt
44 Load bearing eye bolt eye
46 Jaw and eye swivel joint jaw portion
48 Jaw and eye swivel joint
50 Long bolt
52 Swivel joint eye
54 Hydraulic rotator jaws
56 Hydraulic rotator
58 Load bearing eye bolt fastener
60 Long bolt washers
62 Cotter pins
64 Lock
66 Front wall pins
68 Front wall receiving apertures
70 Scale top
72 Scale hanger aperture
74 Scale base
76 Hydraulic rotator attachment plates
78 Hydraulic rotator attachment plate apertures
80 Handheld wireless unit
82 Crane boom
84 Hook
86 Hook attachment
88 Hook attachment jaws
90 Hook attachment jaw eyes
92 Hook attachment bolt
L Load
C Crane
H Protective housing
S Operator station
O Outrigger

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the present invention. The present invention is an anti-torque protection box 10 for crane scales comprising a steel box encapsulating the crane scale having a lift ring (discussed further below) which stops any possible rotation and compression to the scale assembly. Stabilizers 12 at the bottom of the box prevent the pin from rotating and from being pushed back up into the scale. As can be seen in the Figure, the device can operate using a grapple/bin or a hook to attach loads L for weighing.

Figure 2:
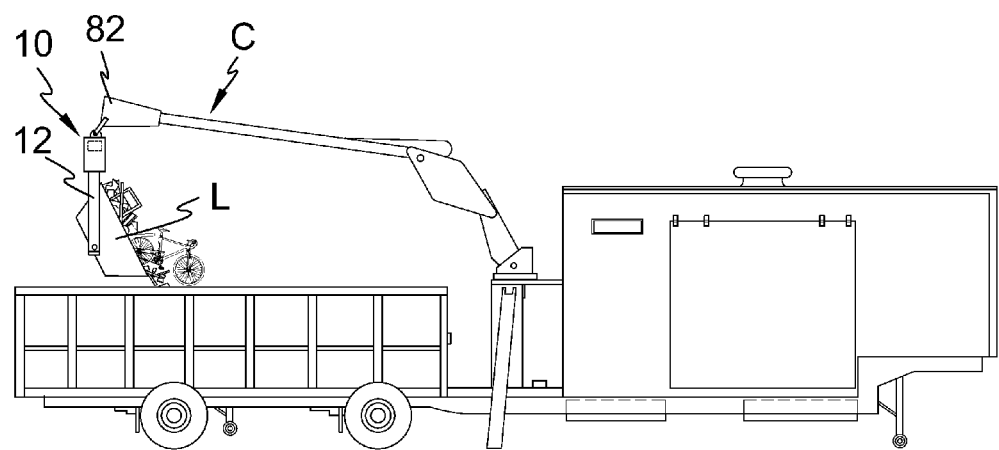
FIG. 2 is an illustrative view of the present invention in use.

Referring to FIG. 2, shown is an illustrative view of the present invention in use. Shown is the crane scale protective housing of the present invention for crane scales mounted to a crane C comprising a steel box or enclosure 10 that encloses the crane scale 38 and that further has a crane boom attachment aperture (see below) which stops any possible rotation and compression to the scale assembly. Stabilizers 12 depending from the bottom of the box 10 prevent the long pin (discussed below) from rotating and from being pushed back up into the scale. The device is shown operating a grapple/bin.

Figure 3:
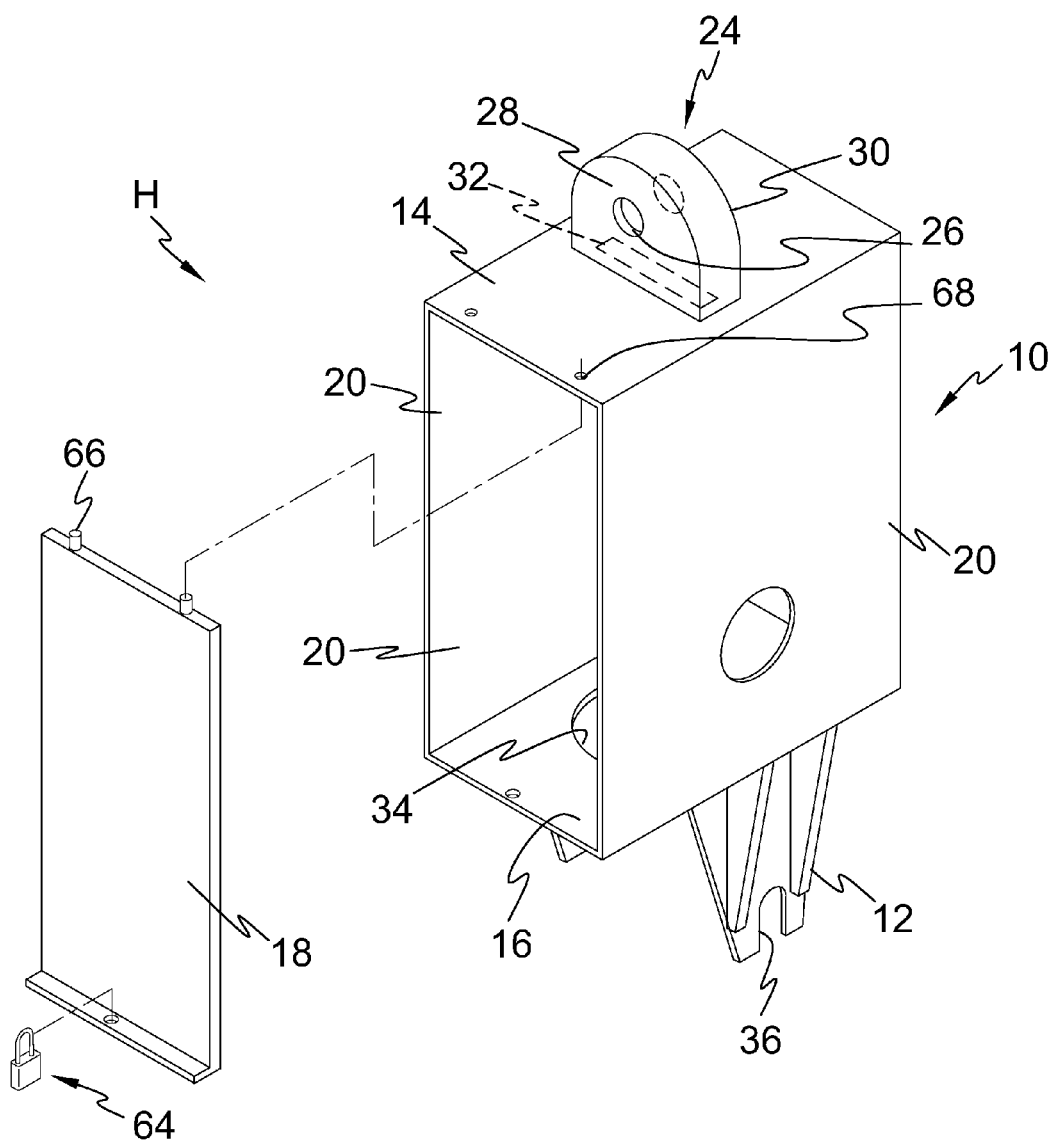
FIG. 3 is a perspective view of the crane scale protective housing.

Referring now to FIG. 3, shown is a perspective view of the crane scale protective housing indicated generally at H. The housing comprises an enclosure 10 having a top wall 14, a bottom wall 16, front wall 18, side walls 20, and a back wall 22 (seen in FIG. 6). The enclosure 10 also includes a crane link compartment 24 extending outwardly from the top wall 14, the crane link compartment 24 having a crane boom attachment bore 26 passing through its front and rear wall 28, 30.crane link compartment 24 also includes an interior access aperture 32 that serves as receptacle or receiver for a scale support hanger (discussed in more detail below). Extending from the bottom of the protective housing is a pair of stabilizers 12 positioned on each side of a large aperture 34 in the bottom wall 16 with each stabilizer 12 having a recess 36 located proximate its base. Another feature of the present invention is the anti-vandalism or theft feature seen in this Figure. The front wall 18 is detachable from the enclosure 10 and is provided with front wall pins 66 and cooperating front wall receiving apertures 68 to secure it in place. A lock 64 is provided, as seen, to prevent unauthorized access to the scale 38.

Figure 4:
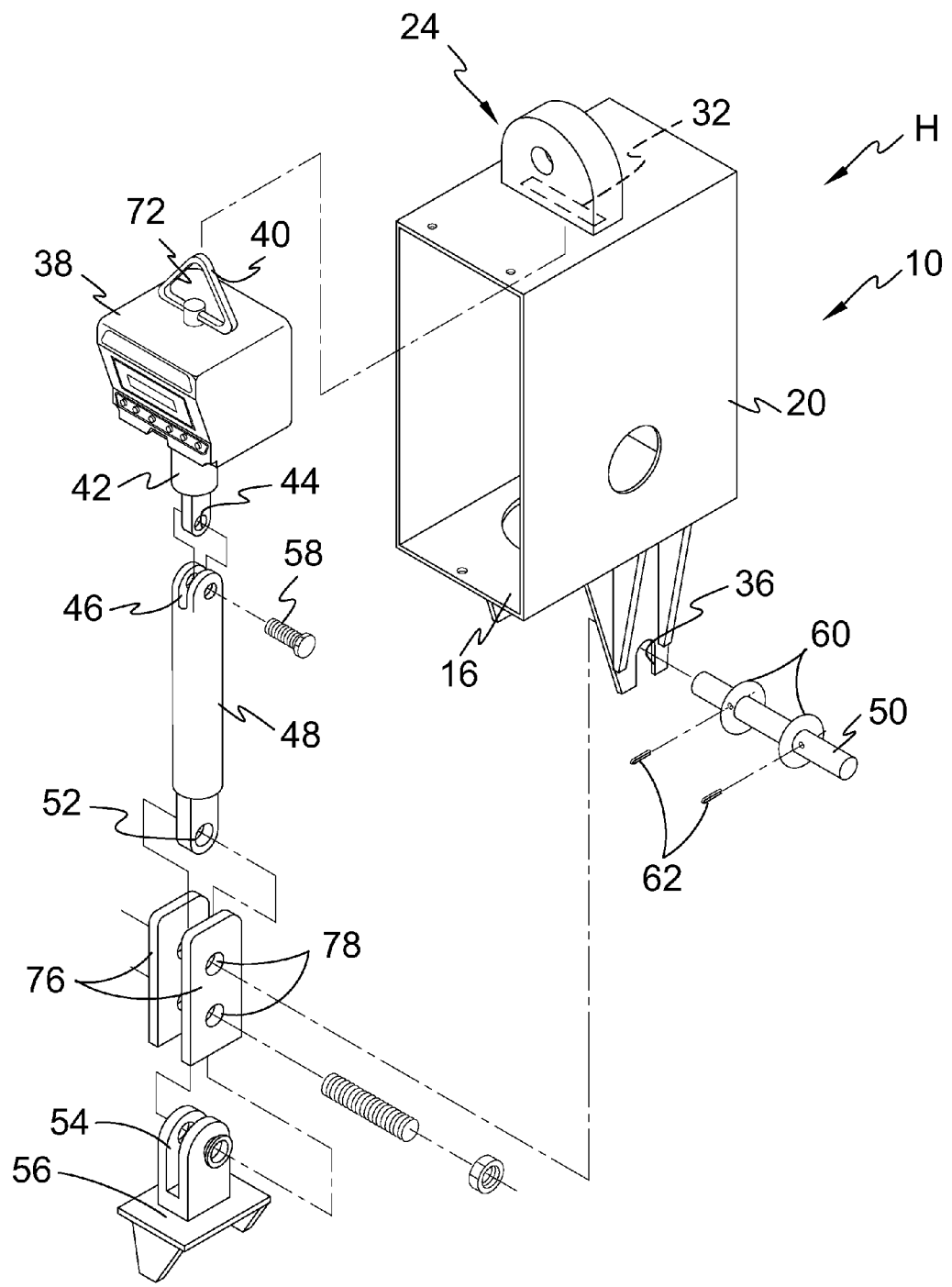
FIG. 4 is an exploded view of the present invention.

Referring to FIG. 4, shown is an exploded view of the present invention. The scale protective housing H encloses a scale 38 with a scale hanger 40 that is positioned, through the crane link access aperture 32, to be within the crane link compartment 24 such that the hanger 40 is coaligned with the crane link attachment bore 26. Thus, the attachment of the scale protective housing H to a crane boom (not shown) supports the housing H, the scale hanger 40, and the scale 38. Projecting from the base of the scale 38 is a load bearing eye bolt 42 with the eye 44 having the jaw portion 46 of a jaw and eye swivel joint 48 attached to it by means of the load bearing eye bolt fastener 58. The swivel joint 48 extends through the large aperture 34 in the bottom wall 16 of the enclosure 10 and between the stabilizer recesses 36 with a long bolt 50 passing through the swivel joint eye 52 projecting to the left and right beyond the stabilizer recesses 36. The long bolt 50 also passes through the jaws 54 of a hydraulic rotator 56 that will support a load and is held in place by washers 60 and cotter pins 62.

Figure 5:
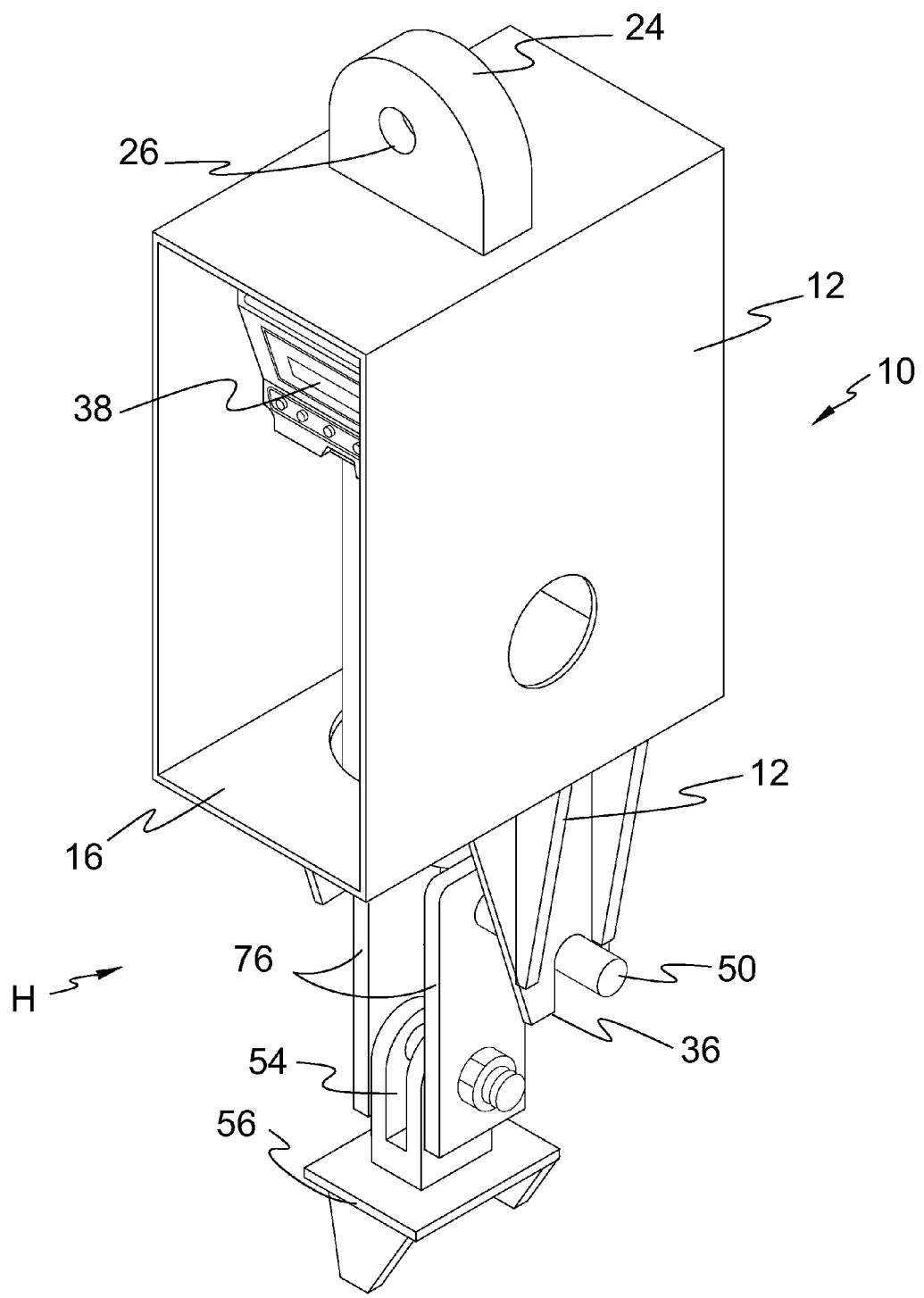
FIG. 5 is a perspective view of the crane scale protective housing.

Referring to FIG. 5, shown is a perspective view of the crane scale protective housing of the present invention illustrating an assembled view of the main components that comprise a crane scale having a protective housing.

Figure 6:
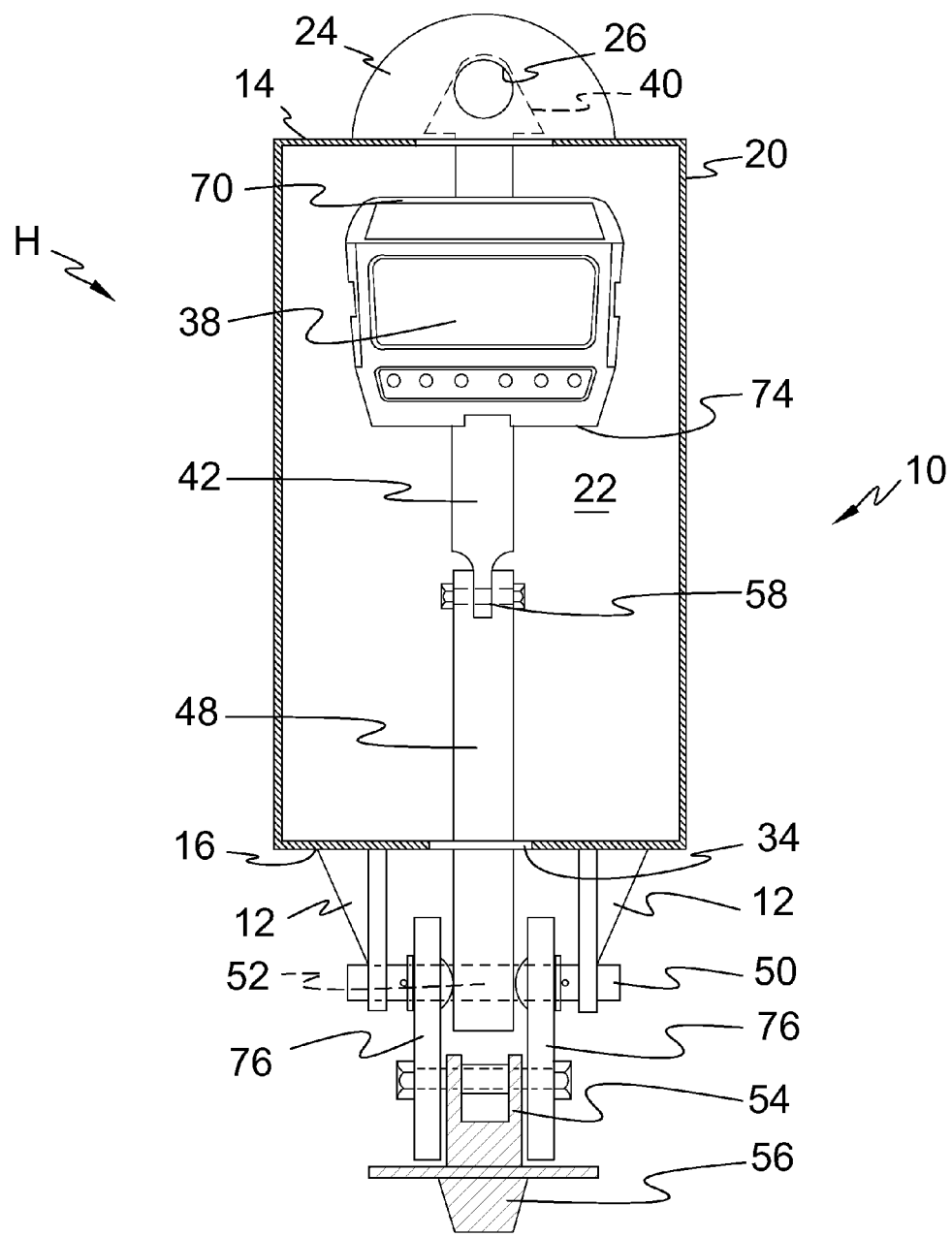
FIG. 6 is a frontal view of the present invention.

Referring to FIG. 6, shown is a frontal view of the present invention. The housing H comprises an enclosure 10 and shown in this Figure are top wall 14, bottom wall 16, side walls 20 and the back wall 22. The crane link compartment 24 extends from the top wall 14 and has a crane boom attachment bore 26 passing through the compartment's front and rear walls, as seen in FIG. 3. Also seen in FIG. 3 is the crane link compartment interior access aperture 32 that serves as receiving area for a scale hanger 40. Extending from the bottom wall 16 of the protective housing 10 is a pair of stabilizers 12 positioned on each side of a large aperture 34 in the bottom wall 16 with each stabilizer 12 having a recess 36 located in or near its base. The scale 38 has, again, a scale hanger 40 located on its top, indicated here at 70, and the hanger 40 is positioned within the crane link compartment access aperture 32 with the hanger aperture 72 (seen in FIG. 4) aligned with the crane boom attachment bore 26 such that a fastener or line connecting the scale protective housing 10 to a crane boom engages both the crane boom attachment bore 26 and the scale hanger aperture 72. Projecting downwardly from the base 74 of the scale is a load bearing eye bolt 42 with a jaw and eye swivel joint 48 attached to it by means of load bearing eye bolt fastener 58. The swivel joint 48 extends through the large opening 34 in the bottom of the protective housing 10 and between the stabilizers 12 recesses 36 where a long bolt 50 is inserted through the swivel joint eye 52 such that bolt 50 projects beyond the ends of the stabilizer recesses 36. Also attached to the long bolt is a pair of hydraulic rotator attachment plates having a pair of apertures 78 for fixedly attaching the jaws 54 of a hydraulic rotator 56 that will support a load.

Figure 7:
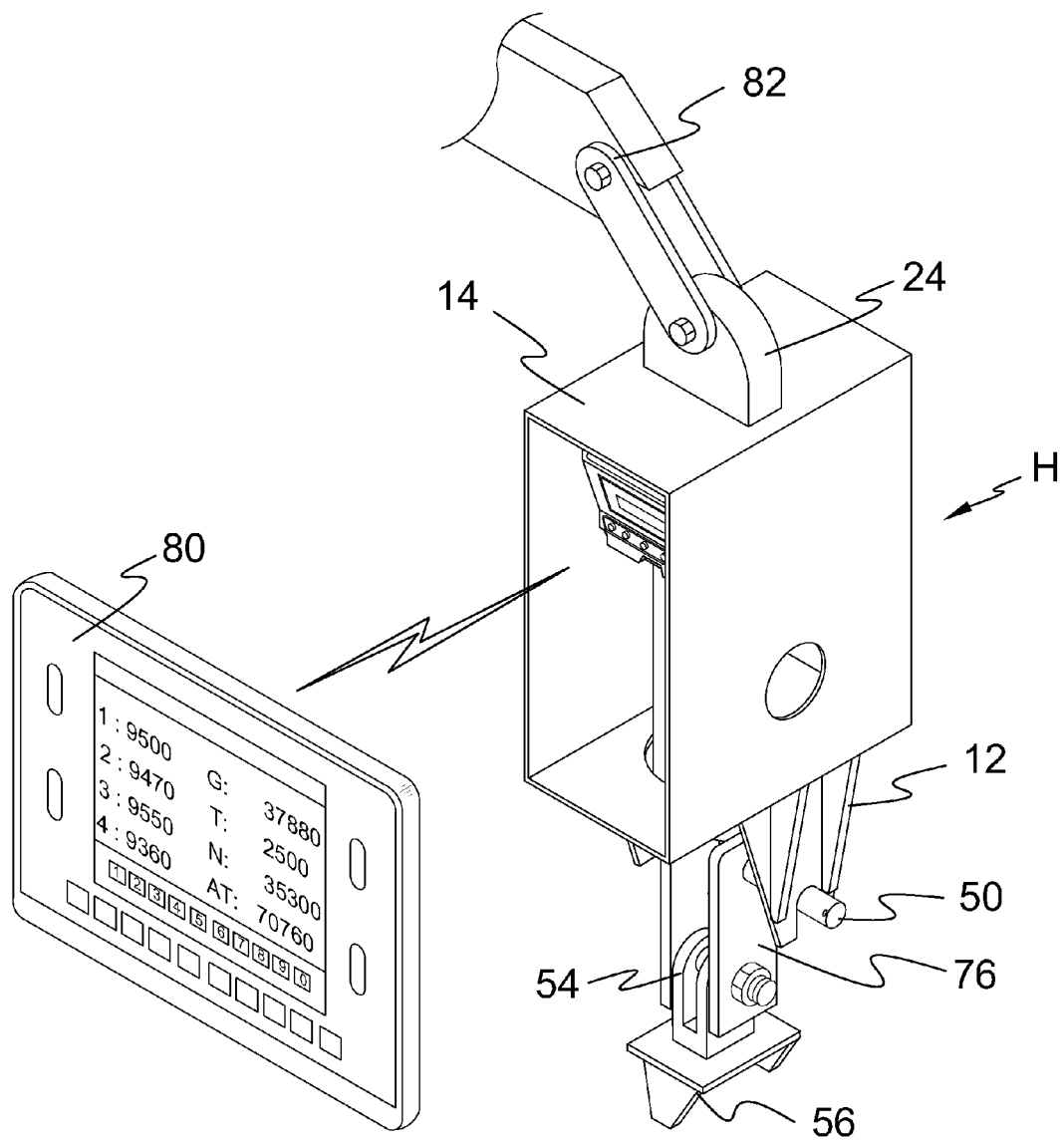
FIG. 7 is an illustrative view of the present invention with a hand-held wireless indicator.

Referring to FIG. 7, shown is an illustrative view of the present invention. Shown is a wireless hand held indicator 80 unit for the scale 38 of the anti-torque protection box H of the present invention. Additionally seen in this Figure is the crane boom 82.

Figure 8:
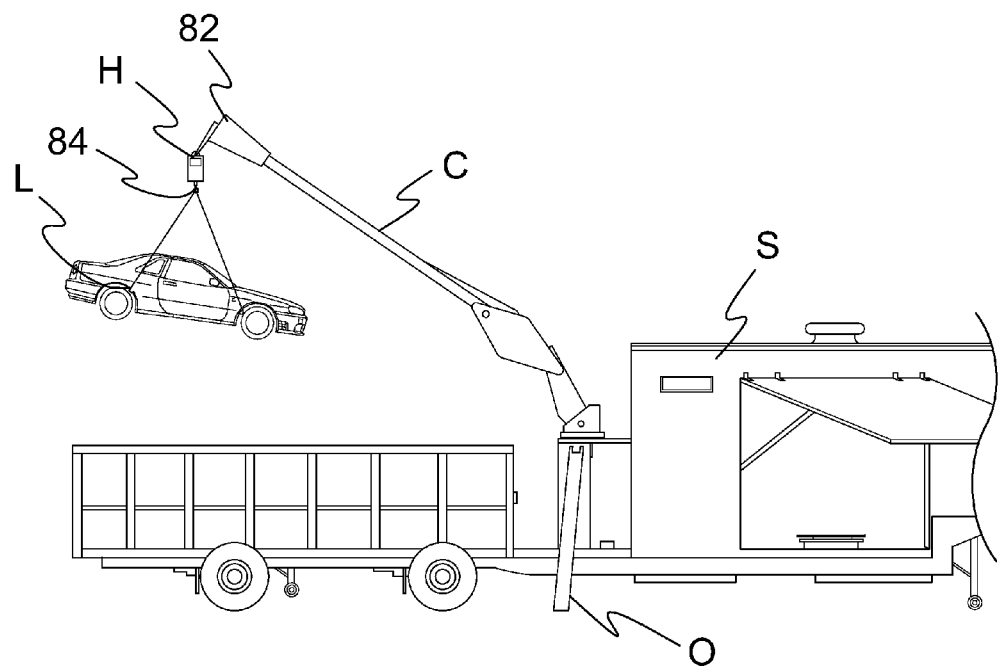
FIG. 8 is an illustrative view of the present invention in use with a hook.

Referring to FIG. 8, shown is an illustrative view of the present invention in use. The crane C is manipulating a load L using a hook 84 and the anti-torque protection box is indicated at H. The crane C is steadied by outrigger O and the user would most likely be in station cabin S. The weight of load L, in this situation, could be determined by the handheld wireless unit 80 (shown in FIG. 7).

Figure 9:
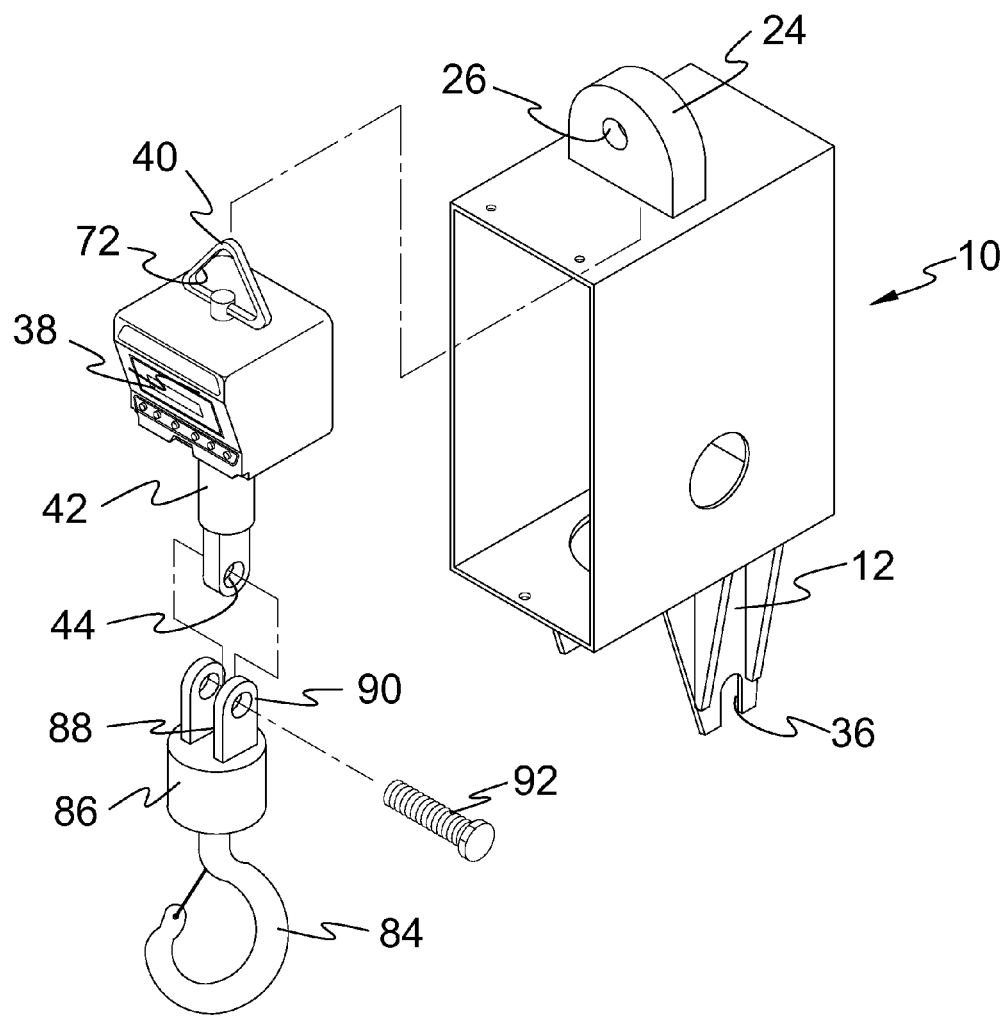
FIG. 9 is an exploded view of the present invention using a hook.

Referring to FIG. 9, shown is an exploded view of the present invention in an embodiment wherein it is using a hook 84. The load bearing eye bolt 42, depending from the bottom of scale 38 is attached to the hook attachment 86 through the hook attachment jaws 88.

The invention claimed is:

1. A scale with a protective housing for use with a crane comprising:

a scale enclosure, said scale enclosure having a top and a bottom, said scale enclosure top including an upwardly extending crane link compartment having an interior and exterior, said crane link compartment further including a crane boom attachment bore and a crane link compartment interior access aperture, and where said scale enclosure bottom includes two downwardly depending stabilizers, each of said stabilizers having a recess located at its distal end, and where said scale enclosure bottom further includes a load aperture therethrough, said load aperture located between said downwardly depending stabilizers;

a scale having a top and a bottom, said scale top having a hanger, disposed thereabove and where said scale hanger has a hanger aperture and said scale bottom having a load bearing portion disposed therebelow, said load bearing portion including an eye therethrough and a load engagement means, and where said scale hanger is adapted to be placed through said crane link compartment interior access aperture such that said scale hanger aperture is aligned with said crane boom attachment bore and where said scale bottom load bearing portion is adapted to be extended through said enclosure bottom load aperture;

a long bolt adapted to be received in said stabilizer recesses and pass through said load bearing portion eye: whereby said scale is placed in said enclosure and said scale hanger is located within said crane link compartment such that said enclosure and said scale may be suspended from a crane boom and said load bearing portion is engaged by said long bolt placed in said recesses in said stabilizers holding said load bearing portion in a spaced relationship thereto such that said scale is protected from torsional and compressional forces while moving and placing an engaged load;

wherein said load bearing portion comprises a first load bearing eye bolt member proximate said scale and a second load bearing jaw and eye swivel joint member, said jaw and eye swivel joint member having a top jaw portion and a bottom eye portion, said top jaw portion of said second load bearing member adapted to engage said first load bearing eye bolt member and said bottom eye portion of said second load bearing member adapted to engage said long bolt and a desired load; and wherein said load bearing portion of said scale further includes a third load bearing member comprising a pair of attachment plates, each of said attachment plates having a pair of apertures, the first of said attachment plate apertures configured to engage said long bolt and, thus, said bottom eye portion of said second load bearing member, and the second of said apertures is configured to engage a hydraulic rotator, where said hydraulic rotator includes upwardly depending jaws.

2. A scale with a protective housing for use with a crane comprising:
- a scale enclosure, said scale enclosure having a top and a bottom, said scale enclosure top including an upwardly extending crane link compartment having an interior and exterior, said crane link compartment further including a crane boom attachment bore and a crane link compartment interior access aperture, and where said scale enclosure bottom includes two downwardly depending stabilizers, each of said stabilizers having a recess located at its distal end, and where said scale enclosure bottom further includes a load aperture therethrough, said load aperture located between said downwardly depending stabilizers;
- a long bolt adapted to be received in said stabilizer recesses;
- a scale having a top and a bottom, said scale top having a hanger, disposed thereabove and where said scale hanger has a hanger aperture and said scale bottom having a load bearing portion disposed therebelow, said load bearing portion comprising a first load bearing eye bolt member proximate said scale and a second load bearing jaw and eye swivel joint member, said jaw and eye swivel joint member having a top jaw portion and a bottom eye portion, said top jaw portion of said second load bearing member adapted to engage said first load bearing eye bolt member and said bottom eye portion of said second load bearing member adapted to engage said long bolt and a desired load, and where said scale hanger is adapted to be placed through said crane link compartment interior access aperture such that said scale hanger aperture is aligned with said crane boom attachment bore and where said scale bottom load bearing portion is adapted to be extended through said enclosure bottom load aperture; whereby
- said scale is placed in said enclosure and said scale hanger is located within said crane link compartment such that said enclosure and said scale may be suspended from a crane boom and said load bearing portion is engaged by said long bolt placed in said recesses in said stabilizers holding said load bearing portion in a spaced relationship thereto such that said scale is protected from torsional and compressional forces while moving and placing an engaged load.

3. The scale and protective housing as claimed in claim 2 where said load bearing portion of said scale further includes a third load bearing member comprising a pair of attachment plates, each of said attachment plates having a pair of apertures, the first of said attachment plate apertures configured to engage said long bolt and, thus, said bottom eye portion of said second load bearing member, and the second of said apertures is configured to engage a hydraulic rotator, where said hydraulic rotator includes upwardly depending jaws.

4. The scale and protective housing as claimed in claim 2 where said load bearing portion of said scale further includes a third load bearing member comprising a pair of attachment plates, each of said attachment plates having a pair of apertures, the first of said attachment plate apertures configured to engage said long bolt and, thus, said bottom eye portion of said second load bearing member, and the second of said apertures is configured to engage a hook engagement, where said hook engagement includes upwardly depending jaws.

5. The scale and protective housing according to claim 2, where said enclosure further includes side walls, a back wall, and a front wall, and where enclosure is made of steel.

6. The scale and protective housing according to claim 5, where said front wall is removable to provide access to the interior of said enclosure.

7. The scale and protective housing according to claim 6, where said front wall includes locking means to prevent unauthorized access to the interior of said enclosure.

8. A scale with a protective housing for use with a crane comprising:
- a scale enclosure, said scale enclosure having a top and a bottom, said scale enclosure top including an upwardly extending crane link compartment having an interior and exterior, said crane link compartment further including a crane boom attachment bore and a crane link compartment interior access aperture, and where said scale enclosure bottom includes two downwardly depending stabilizers, each of said stabilizers having a recess located at its distal end, and where said scale enclosure bottom further includes a load aperture therethrough, said load aperture located between said downwardly depending stabilizers;
- a scale having a top and a bottom, said scale top having a hanger, disposed thereabove and where said scale hanger has a hanger aperture and said scale bottom having a load bearing portion disposed therebelow, said load bearing portion including an eye therethrough and a load engagement means, and where said scale hanger is adapted to be placed through said crane link compartment interior access aperture such that said scale hanger aperture is aligned with said crane boom attachment bore and where said scale bottom load bearing portion is adapted to be extended through said enclosure bottom load aperture;
- a long bolt adapted to be received in said stabilizer recesses and pass through said load bearing portion eye: whereby
- said scale is placed in said enclosure and said scale hanger is located within said crane link compartment such that said enclosure and said scale may be suspended from a crane boom and said load bearing portion is engaged by said long bolt placed in said recesses in said stabilizers holding said load bearing portion in a spaced relationship thereto such that said scale is protected from torsional and compressional forces while moving and placing an engaged load;
- wherein said load bearing portion comprises a first load bearing eye bolt member proximate said scale and a second load bearing jaw and eye swivel joint member, said jaw and eye swivel joint member having a top jaw portion and a bottom eye portion, said top jaw portion of said second load bearing member adapted to engage said first load bearing eye bolt member and said bottom eye portion of said second load bearing member adapted to engage said long bolt and a desired load; and wherein said load bearing portion of said scale further includes a third load bearing member comprising a pair of attachment plates, each of said attachment plates having a pair of apertures, the first of said attachment plate apertures configured to engage said long bolt and, thus, said bottom eye portion of said second load bearing member, and the second of said apertures is configured to engage a hook engagement, where said hook engagement includes upwardly depending jaws.

* * * * *